S. K. BEHREND.
FILTER PRESS.
APPLICATION FILED JULY 21, 1905.
924,131.
Patented June 8, 1909.
4 SHEETS—SHEET 4.
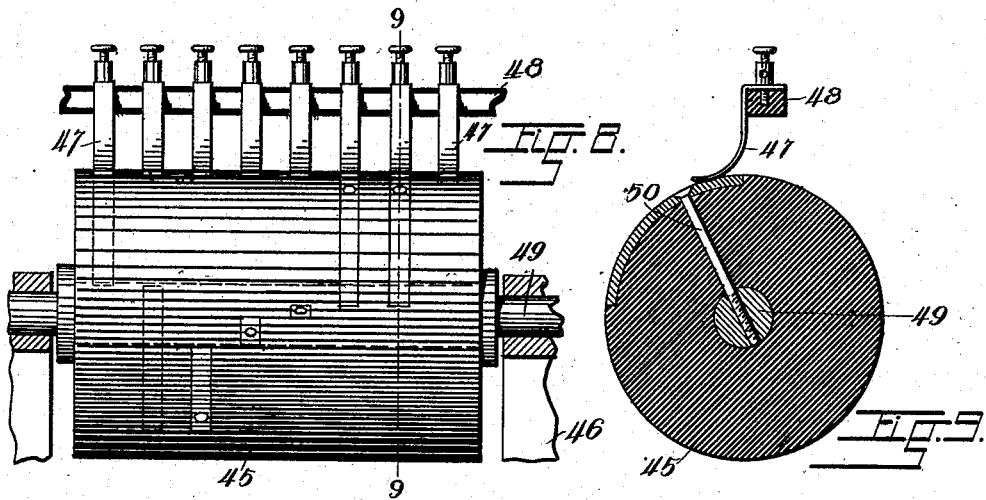
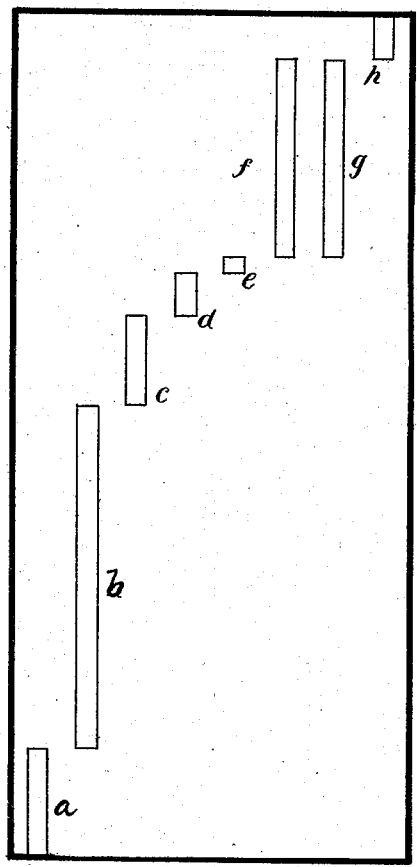
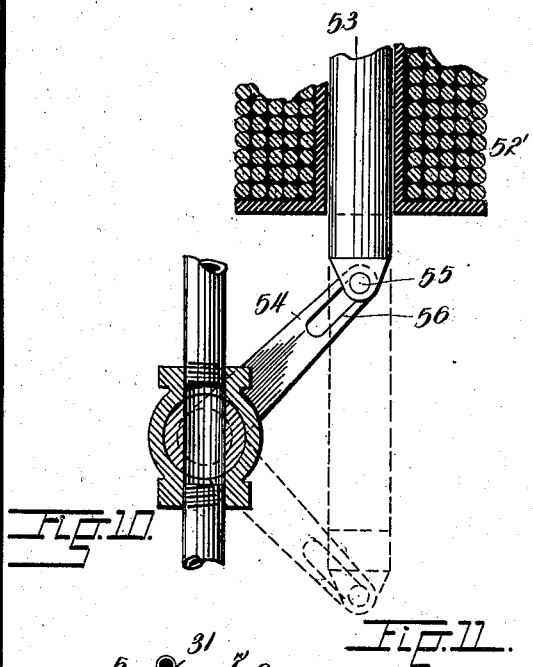
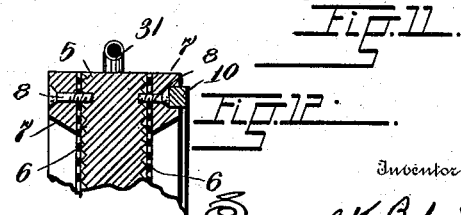

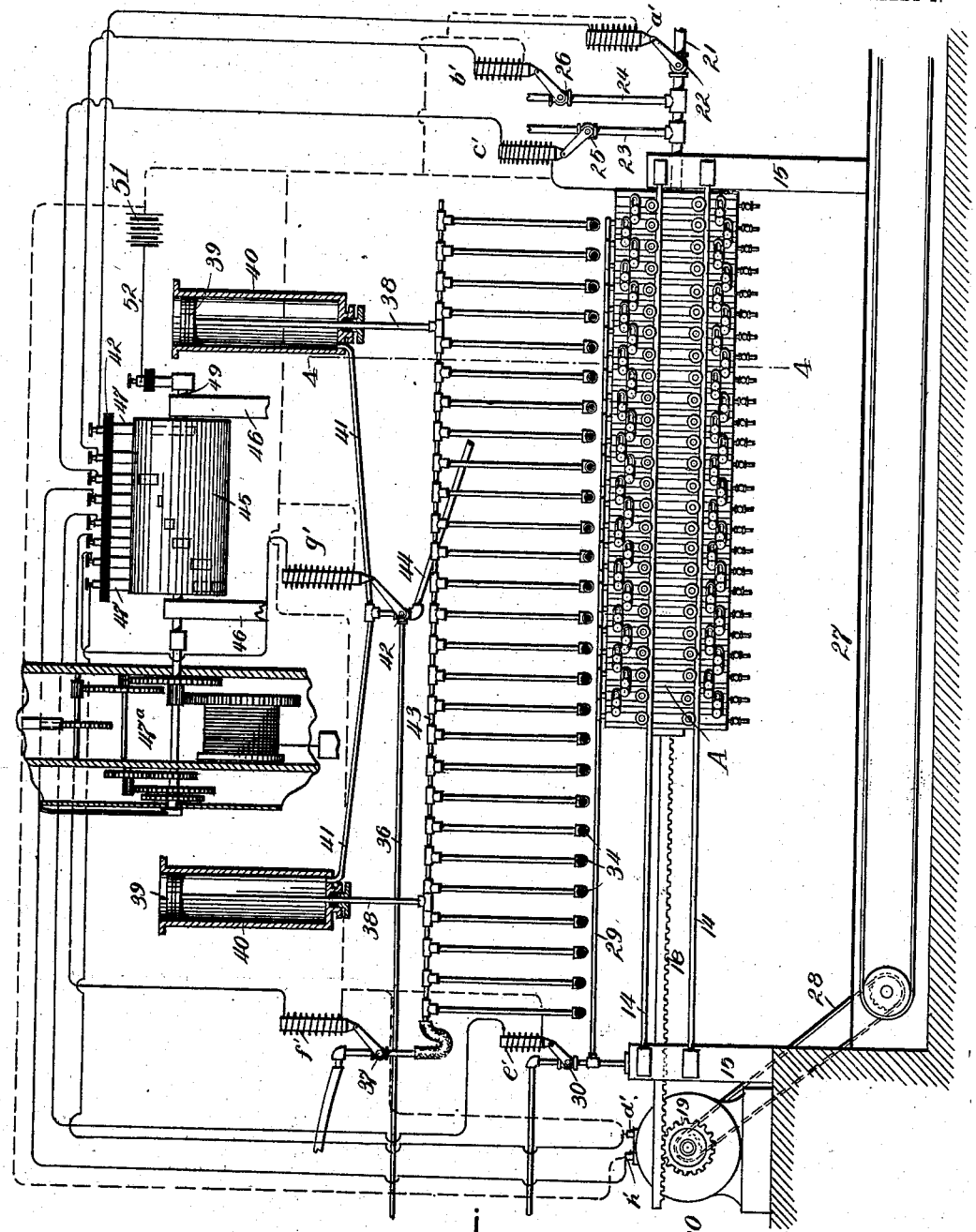

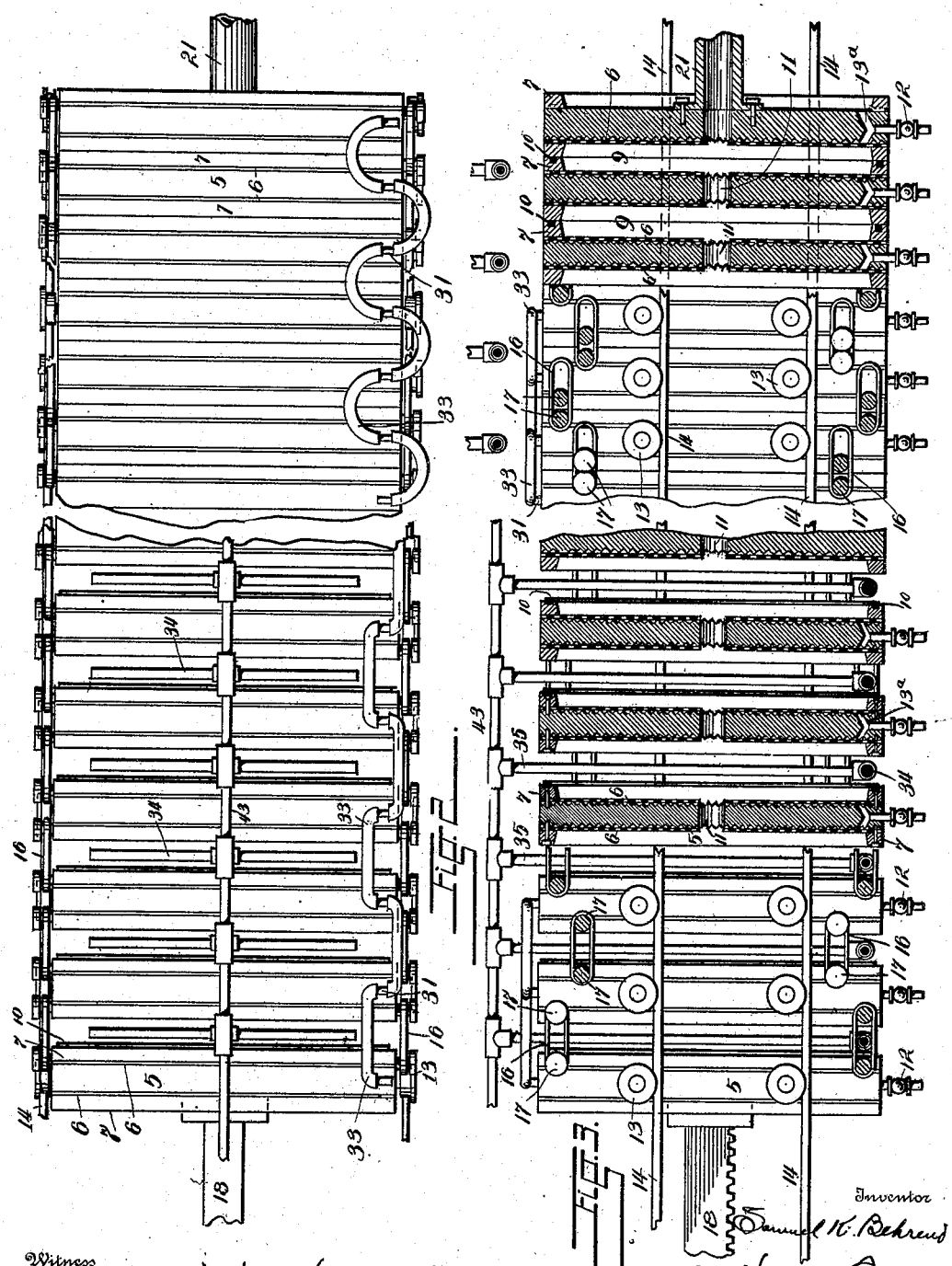

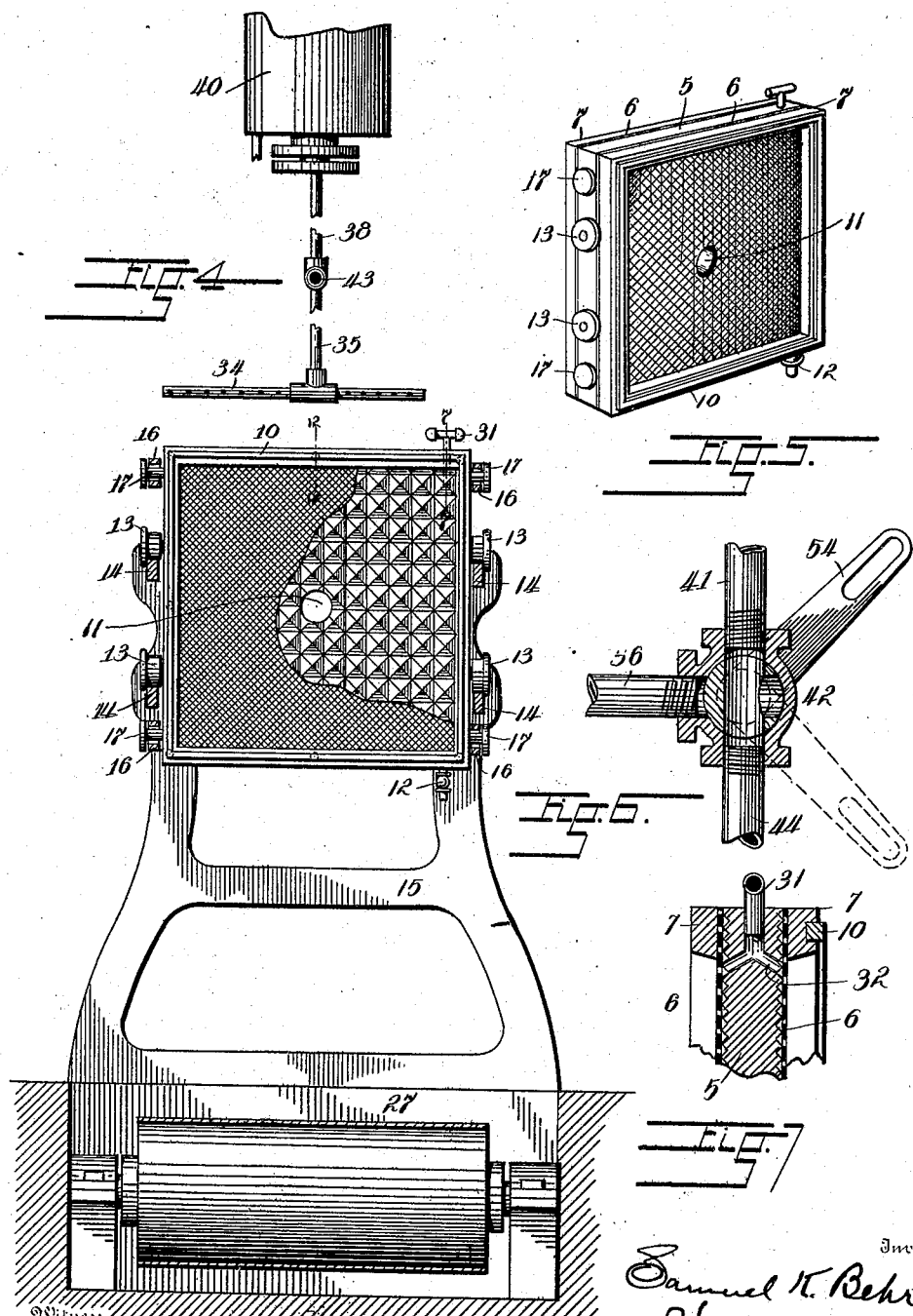

UNITED STATES PATENT OFFICE.

SAMUEL K. BEHREND, OF DENVER, COLORADO.

FILTER-PRESS.

No. 924,131.  Specification of Letters Patent.  Patented June 8, 1909.

Application filed July 21, 1905. Serial No. 270,663.

*To all whom it may concern:*

Be it known that I, SAMUEL K. BEHREND, a citizen of the United States, residing at Denver, in the county of Denver and State of Colorado, have invented certain new and useful Improvements in Filter-Presses, of which the following is a specification.

My invention relates to improvements in filter presses, employed for the treatment of slimes or other material in cyanid plants and has for its object the provision of an apparatus which will automatically and periodically perform the various operations required in carrying out the process.

In the accompanying drawings, Figure 1 illustrates a side elevation of the press in operative position, together with various elements required in its operation and a diagrammatical representation of the electric circuits by which the several parts are energized. Fig. 2 represents a fragmentary plan view of the press partly in the open or extended position. Fig. 3 is a side elevation of the same partly in section. Fig. 4 is an enlarged cross section taken on line 4—4, Fig. 1. Fig. 5 is a perspective view of one of the filter plates. Fig. 6 is a sectional view of the three-way valve by which the water supply required in washing the plates is controlled. Fig. 7 is an enlarged section taken along the line 7—7, Fig. 4. Fig. 8 is an enlarged side elevation of the commutator. Fig. 9 is a cross section taken on the line 9—9, Fig. 8. Fig. 10 shows the development of the outer surface of the commutator with relative arrangement of contacts. Fig. 11 is an enlarged sectional view of one of the valves employed to control the supply of water and air during the operation of the device, and Fig. 12 is a fragmentary cross section taken along a line 12, 12, Fig. 4.

The press A consists of a series of filter plates 5, the grooved or serrated surfaces of which are covered by the filtering cloth 6. These cloths 6 are stretched over the cake frames 7 and secured along the outer edges by screws 8 which, adjoining, compose the cells or chambers 9, in which the cakes are formed. One of each pair of adjoining frames 7 is supplied with a packing strip 10 to insure water- and air-tight joints. Plates 5 are furthermore provided with central passages 11 through which the various chambers of the filter press are charged and with valve controlled drain-pipes 12, which connecting with the sides of the frame by conduits 13$^a$ afford means to decant the fluids from the filtering cells.

The entire series of adjoining plates are supported by means of antifriction wheels 13, on horizontally disposed rails 14, which are connected with and supported upon the standards 15 located at the ends of the machine. The several plates are furthermore connected with the adjoining ones by means of short links 16 placed over headed studs 17 which extend from the sides of the plates. When the various frames are together or closed, these links, which in length exceed the distance between the studs over which they are placed, extend in the direction of the feed end of the machine and limit the distance between each two frames when the press is in its open or extended position.

An inverted longitudinally extending rack 18, secured to the outer or last plate of the series composing the press, engages a pinion 19 mounted on the shaft of an electric motor 20, by which the press is opened and closed, while the outer plate at the opposite end of the apparatus is secured to the centrally located feed or charging pipe 21, having supply valve 22 to which water- and air-supply pipes 23 and 24 connect, the supply through which may be controlled by valves 25 and 26, located in them respectively.

A conveyer belt 27, operatively connected with the motor by a belt 28, extends below the press and is designed to convey the cakes discharged therefrom to any convenient place or receptacle.

The numeral 29 indicates a flexible air-supply pipe having a valve 30 and connected with a T shaped pipe 31, (see Fig. 4) which, extending from the upper edge of the outer filter plate communicates with the space between the sides of the plate and the filtering cloths by means of channels 32, (see Fig. 7). Each subsequent plate is provided with a similar pipe which connects with that of the preceding frame by means of flexible tubes 33. The object of these connections is to disengage the cakes from the sides of the frames when the latter are separated, by introducing a blast of air between the filtering cloths and the serrated surfaces, causing the momentary bulging of the former.

When the press is in its open position and the cakes formed in chambers 9 have been discharged, the surface of the filtering cloths is washed by means of perforated pipes 34, which extending laterally from vertical pipes 35 have a vertical reciprocating movement between each two frames.

Pipes 35 are connected at their upper extremities with a horizontal extending supply pipe 43 having a valve 37 and secured to the lower extremities of piston rods 38, the pistons 39 on which have a reciprocating movement in vertically disposed cylinders 40. Pipes 41 lead from the lower ends of these cylinders to the three-way valve 42, illustrated in Fig. 6, through which water or other fluid may alternately be charged into and discharged from the interior of the cylinders.

When pipes 34, 35 and 36 are in the raised position as shown in Fig. 1, the pistons being in the upper portion of the cylinders are held by the pressure of the water supplied through pipes 41. They are lowered by reversing valve 42 which, closing the supply pipe 36 simultaneously connects pipes 41 with the outlet 44.

The various valves and elements comprised in the apparatus are consecutively operated by a cylindrical commutator 45, which being revolubly mounted in bearings 46 is operatively connected with a clock mechanism 47$^a$. Commutator 45 is composed of fiber or other insulating material and carries on its outer surface the contact plates $a, b, c, d, e, f, g$ and $h$ respectively and electrically connected with one of the terminals of the correspondingly named electrical appliances which form part of the apparatus.

The various circuits are opened and closed by brushes 47 which being mounted on an insulating support 48 engage the peripheral surface of the commutator in the path of the various contact plates which are electrically connected with the central shaft 49 by bolts 50 or other suitable means.

From the source of electricity 51 one wire 52 leads to the shaft 49 which is electrically connected with the various contact plates while the opposite pole is similarly connected with the opposite terminals of the various electrically operating parts of the machine.

It will be observed that the wires leading from the brushes corresponding with plates $d$ and $h$ lead to opposite terminals of motor 20 for the purpose of alternately rotating the pinion in opposite directions to open and close the press.

The different valves employed to control the supply and discharge through the various pipes are operated by vertically placed solenoids 52 (see Fig. 11), the cores 53 of which are connected at their lower extremity to valve levers 54 by a pin or bolt 55, passing through a slot 56.

Each valve employed in the device is reversed by rotating it one quarter of a revolution.

The operation of the apparatus is briefly as follows: The various plates having been contiguously placed on the rails as illustrated in Fig. 1, the clock mechanism is set in motion, which by rotating the commutator, consecutively energizes the motor and the various solenoids at predetermined periods. The operation commences with opening supply valve 22 in the feed pipe by means of solenoid $a'$ and charging the chambers 9 between plates 5 with the slimes or other material which are forced through pipe 21 by means of compressed air. When the press is completely filled, valve 22 is closed by breaking the contact between plate $a$ and the corresponding brush and valve 26 opens, plate $b$ causing solenoid $b'$ to act, thus permitting the wash water to enter the filter for a period of from thirty to forty minutes at the termination of which the valve 26 closes and valve 25 in the air supply pipe is opened in similar manner, whereby compressed air is forced through the press. The time required to charge the filtering press inclusive of the introduction of water and air is from forty to fifty minutes at the expiration of which the motor is energized. Pinion 19 engaging the rack causes the thereto attached outer plate to separate from the adjoining one until arrested by links 16, which engaging the studs on the latter plate cause it to follow the preceding one and separate from the next one. This operation is continued until all the plates comprised in the series are separated, when the motor is stopped and valve 30 in the air supply pipe 29 is opened for a short period to disengage the cakes from the filtering cloths as heretofore described. It will be understood that the length of the connecting links and consequently the distance between the separated filter plates is such that the cakes which during the described operation were formed in chambers 9 may drop onto the belt conveyer 27, which during the next rotation of the motor shaft conveys them to their destination. To prepare the press for the next working, the three-way valve 42 is reversed, causing the foraminated pipes 34 to be lowered and move in between the separated plates, which by spraying the filter cloths as they descend remove the thereto adhering substances. The moment pistons 39 have reached their normal position and the supply valve 37 is closed, contact plate $h$ comes in contact with the corresponding brush which, causing the motor to reverse its former movement consecutively closes the chambers between the filtering plates and returns the press to its original condition preparatory to the next operation.

The entire operation of filling and working the press consumes approximately ninety minutes which period may be shortened or lengthened at will by adjustment of the clock mechanism.

Having fully described my invention, what

I claim as new and desire to secure by Letters Patent is:

1. In a filter press, the combination with a suitable support and tracks, of a plurality of frames mounted to travel on said tracks, and automatic means for forcing them together and separating them.

2. In a filter press, the combination with a suitable support and tracks, of a plurality of frames mounted to travel on said tracks, automatic means for forcing them together and separating them, and packings between said frames, whereby to form water and air tight chambers therebetween.

3. In a filter press, the combination with a suitable support, of frames mounted to move on said supports, said frames loosely connected to one another, whereby after a limited separation of two frames, the third and fourth will be separated, and so on until all are pulled apart, and automatic means for separating and uniting said frames.

4. In a filter press, the combination with a suitable support and tracks, of frames mounted to travel on said tracks, said frames loosely connected to one another, whereby after a limited separation of two frames, the third and fourth will be separated and so on until all are pulled apart, and automatic means for applying power at one end of the series of frames for separating them and for forcing them together.

5. In a filter press, the combination with a suitable support, of frames guided thereby and links loosely connecting said frames, whereby they may be separated a predetermined distance, and automatic means for pulling them apart.

6. In a filter press, the combination with a suitable support, of frames guided thereby, said frames having studs thereon and links loosely connecting said studs whereby to admit of their being separated a limited distance, and means for automatically separating the frames.

7. In a filter press, a press frame comprising two roughened plates lined with filtering material, automatic means for forcing and holding the plates together with a water and air tight joint between them, whereby a filter chamber is formed, and means for draining said filter chambers.

8. In a filter press, a press frame comprising two roughened plates lined with filtering material, means for holding the plates together with water and air tight joint between them, whereby a filter chamber is formed, means for separating said plates and filtering material, whereby to loosen the cake formed in the chamber, and automatically movable means for washing the surfaces of the filter.

9. In a filter press, the combination with a plurality of filter chambers, a pipe for feeding slimes or other material into the filter chambers, pipes for introducing wash water and compressed air into said chambers, valves in said pipes and automatic means for controlling said valves successively at predetermined periods.

10. A filter press comprising separable plates and means for automatically uniting and separating said plates.

11. In a filter press, the combination with frames, comprising roughened filter plates and filtering material thereon, of compressed air pipe discharging into the frames between the plates and the filtering material for loosening the latter from the plates, a valve for said air pipe, and means for automatically controlling the valve at a predetermined interval.

12. In a filter press, the combination with filter frames comprising roughened plates and filter cloths thereon, of a main charging-pipe, a controlling valve therefor, a wash-water pipe, and a compressed air pipe leading into said charging-pipe, valves in said air and wash water pipes discharging into the frames between the plates and filter cloths, a valve for said pipe, and means for automatically controlling said valves at predetermined intervals.

13. In a filter press, the combination with filter frames, comprising roughened plates and filter cloths thereon, of a main charging-pipe, a controlling valve therefor, a wash water pipe and a compressed air pipe leading into said charging-pipe, valves in said air and wash water pipes, an air pipe discharging into the frames between the plates and the filter cloths, a valve for said pipe, and a rinsing pipe, and a valve therein.

14. In a filter press, the combination with filter frames, comprising roughened plates and filter cloths thereon, of a main charging-pipe, a controlling valve therefor, a wash water pipe and a compressed air pipe leading into said charging-pipe, valves in said air and wash water pipes, an air pipe discharging into the frames between the plates and filter cloths, a valve for said pipe, a rinsing pipe, a valve therein, means for automatically raising and lowering said rinsing pipe, a valve for controlling said means and means for automatically controlling said valves at predetermined intervals.

15. In a filter press, the combination with filter frames comprising roughened plates and filter cloths thereon, of a main charging pipe, a controlling valve therefor, a wash water pipe and a compressed air pipe leading into said charging pipe, valves in said air and wash water pipes, an air pipe discharging into the frames between the plates and filter cloths, a valve for said pipe, a rinsing pipe, a valve therein, means for raising and lowering said rinsing pipe, a valve for automatically controlling said valves at predetermined intervals, said means comprising cylinders, pistons therein connected with the pipe and a fluid pressure pipe for controlling the pistons.

16. The combination of filters composed of separable frames, automatic means for uniting and separating said frames, a charging-pipe for supplying slimes or other material to the frames, a valve therefor, and means for controlling the valve.

17. The combination of filters composed of separable frames, means for uniting and separating said frames, a charging pipe for supplying slimes or other material thereto, a wash water pipe leading into the charging pipe, valves for said pipes, and means for automatically controlling the valves at predetermined intervals.

18. The combination of filters, composed of separable frames, means for uniting and separating said frames, a charging pipe for supplying slimes or other material thereto, a wash water pipe, and a compressed air pipe discharging into said pipes, and means for automatically controlling said valves at predetermined intervals.

19. The combination of filters composed of separable frames, each frame comprising a roughened plate and a filter cloth, automatic means for separating said frames and for forcing them together.

20. The combination of filters composed of separable frames, each frame comprising a roughened plate and a filter cloth, automatic means for separating said frames, and for forcing them together, means for supplying slimes or other material, wash water and compressed air to the several filters, means for decanting the fluid therefrom, means for removing the formed cakes when the filters are separated and for rinsing said filters when apart, and means for automatically controlling these several operations.

21. In a filter press, the combination with a plurality of separable filters, of a rinsing pipe having branches with spray nozzles in position to enter between said filters when separated, and means for reciprocating said rinsing pipe and for controlling the discharge of water.

22. In a filter press, the combination with a plurality of filters comprising separable frames and automatic electrical means for joining and separating said frames and for controlling the passage of material thereto.

23. The combination with a plurality of separable filter frames, pipes for introducing slimes or other material, wash water and air and for discharging rinsing water, valves for said pipes, a moving commutator, brushes therefor, the valves being electrically controlled and operated by the commutator at predetermined intervals.

24. A combination with separable filters, a motor for separating the latter and forcing them together, pipes for supplying material to the filters electrically controlled valves for these pipes, a revolving commutator, brushes therefor for electrically controlling the valves, and means for rotating the commutator.

25. A combination with separable filters, a motor for separating the latter and forcing them together, pipes for supplying material to the filters, electrically controlled valves for these pipes, a revolving commutator, brushes therefor, for electrically controlling the valves and means for rotating the commutator, a rinsing pipe and electrically controlled valve therefor, fluid pressure mechanism for controlling the position of the rinsing pipe, and an electrically controlled valve therefor, said valves and motor operated automatically at predetermined intervals through the contact of the brushes with contact plates on the commutator.

26. An automatic filter press comprising a plurality of separable press units and automatic means for uniting and separating said units.

27. An automatic filter press comprising a plurality of separable press units, and automatically reversible power mechanism for successively uniting and separating the units.

28. An automatic filter press comprising a plurality of separable press units, and power mechanism comprising a rotary shaft and transmitting means extending therefrom to one of the units for controlling the entire series.

29. An automatic filter press comprising separable press units and an automatically reversible electric motor for uniting and separating them.

30. A filter press comprising separable plates, means for separating said plates and automatically controlled mechanism for washing the surfaces of the plates.

31. A filter press comprising separable plates, means for separating the plates, and water sprayers which automatically enter the spaces formed between the plates when the latter separate and discharge their contents against the surfaces of the plates.

32. A filter press comprising separable plates, and spray pipes which automatically enter the spaces formed by the separation of the plates and discharge their contents thereagainst and recede in time to permit the plates to come together.

In testimony whereof I affix my signature in presence of two witnesses.

SAMUEL K. BEHREND.

Witnesses:
MARK F. POSTLEWAIT,
H. M. BEATTY.